US008646065B2

(12) United States Patent
Oberle et al.

(10) Patent No.: US 8,646,065 B2
(45) Date of Patent: Feb. 4, 2014

(54) METHOD FOR ROUTING BI-DIRECTIONAL CONNECTIONS IN A TELECOMMUNICATION NETWORK BY MEANS OF A SIGNALLING PROTOCOL VIA AN INTERPOSED FIREWALL WITH ADDRESS TRANSFORMATION DEVICE AND ALSO A TELECOMMUNICATION NETWORK AND SECURITY AND TUNNEL DEVICE FOR THIS

(75) Inventors: Karsten Oberle, Mannheim (DE); Peter Domschitz, Stuttgart (DE)

(73) Assignee: Alcatel Lucent, Paris (FR)

( * ) Notice: Subject to any disclaimer, the term of this patent is extended or adjusted under 35 U.S.C. 154(b) by 2407 days.

(21) Appl. No.: 11/233,116

(22) Filed: Sep. 23, 2005

(65) Prior Publication Data

US 2006/0075483 A1 Apr. 6, 2006

(30) Foreign Application Priority Data

Oct. 4, 2004 (EP) ..................................... 04292353

(51) Int. Cl.
*G06F 9/00* (2006.01)
(52) U.S. Cl.
USPC .......................................................... 726/14
(58) Field of Classification Search
USPC ........ 726/11, 14, 12; 709/229, 238, 227, 228; 713/151–153
See application file for complete search history.

(56) References Cited

U.S. PATENT DOCUMENTS

| 6,980,526 | B2 | 12/2005 | Jang et al. |
| 2003/0126230 | A1 | 7/2003 | Donatelli et al. |
| 2003/0140142 | A1 | 7/2003 | Marples et al. |
| 2005/0201370 | A1* | 9/2005 | Poyhonen et al. ............ 370/389 |
| 2005/0226254 | A1* | 10/2005 | Vimpari ................... 370/395.52 |
| 2006/0168321 | A1* | 7/2006 | Eisenberg et al. ............ 709/238 |
| 2006/0259625 | A1* | 11/2006 | Landfeldt et al. ............ 709/227 |

FOREIGN PATENT DOCUMENTS

WO WO 03/083692 A1 10/2003

* cited by examiner

*Primary Examiner* — Beemnet Dada
(74) *Attorney, Agent, or Firm* — Harness, Dickey & Pierce

(57) ABSTRACT

The invention relates to a method for routing a bi-directional end-to-end connection between an end subscriber and the domain of a service provider by means of a signalling protocol via an interposed firewall with address transformation device, wherein by means of a security and tunnel device, located in the end-to-end connection between the end subscriber and the firewall with address transformation device in the domain of the end subscriber, and a session border controller, located in the end-to-end connection in the domain of the service provider, a tunnel is set up between the security and tunnel device and the session border controller and a bi-directional data exchange takes place via the tunnel between the end subscriber and the domain of the service provider in the area between the security and tunnel device and the session border controller by means of a tunnel protocol, and also a telecommunication network and a security and tunnel device for this.

13 Claims, 1 Drawing Sheet

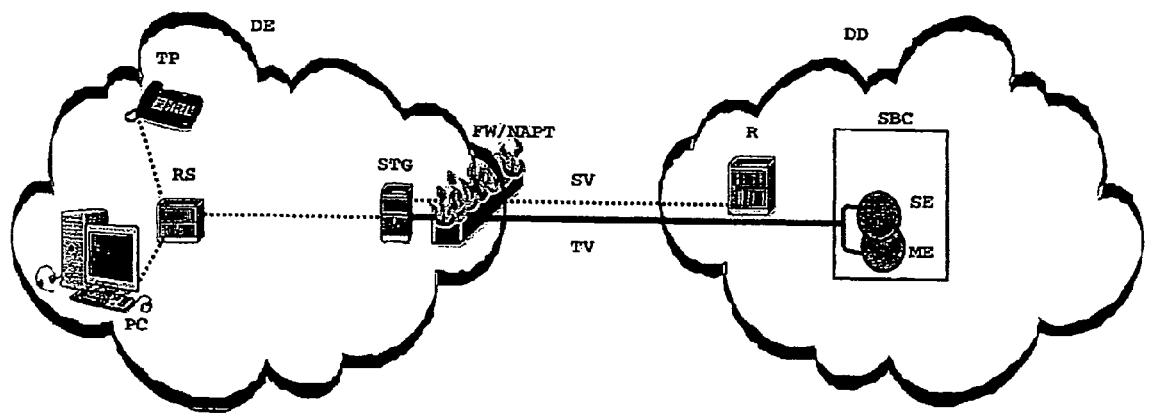

METHOD FOR ROUTING BI-DIRECTIONAL CONNECTIONS IN A TELECOMMUNICATION NETWORK BY MEANS OF A SIGNALLING PROTOCOL VIA AN INTERPOSED FIREWALL WITH ADDRESS TRANSFORMATION DEVICE AND ALSO A TELECOMMUNICATION NETWORK AND SECURITY AND TUNNEL DEVICE FOR THIS

The invention is based on a priority application EP 04 292 353.2 which is hereby incorporated by reference.

TECHNICAL FIELD

The invention relates to a method for routing a bi-directional end-to-end connection between an end subscriber and the domain of a service provider by means of a signalling protocol via an interposed firewall with address transformation device, wherein by means of a security and tunnel device, located in the end-to-end connection between the end subscriber and the firewall with address transformation device in the domain of the end subscriber, and a session border controller, located in the end-to-end connection in the domain of the service provider, a tunnel is set up between the security and tunnel device and the session border controller and a bi-directional data exchange takes place via the tunnel between the end subscriber and the domain of the service provider in the area between the security and tunnel device and the session border controller by means of a tunnel protocol, a telecommunication network for executing a method for routing a bi-directional end-to-end connection between an end subscriber and the domain of a service provider by means of the SIP protocol via an interposed firewall with address transformation device and a security and tunnel device for a telecommunication network for executing a method for routing a bi-directional end-to-end connection between an end subscriber and the domain of a service provider by means of the SIP protocol via an interposed firewall with address transformation device.

BACKGROUND OF THE INVENTION

For constructing, checking and terminating bi-directional end-to-end connections, based, e.g., on User Datagram Protocol (UDP), in telecommunication networks, by which, e.g., voice services such as Voice over Internet Protocol (VoIP) or the exchange of multimedia data is enabled, the so-called Session Initiation Protocol (SIP) is preferably used, as by this protocol additional services, e.g. for call checking, mobility and interoperability between various existing telephone systems can also easily be made available. The SIP messages used in this case are normally likewise transported by UDP packets. Signalling messages of the SIP protocol, such as, e.g. INVITE, include the IP address and information on the UDP port to which the reply, such as, e.g. 200OK, should be sent by the receiver of the first message. In the so-called SDP descriptor (SDP=Session Description Protocol) the SIP messages contain information on the User Agent Client (UAC), i.e. the caller, and the User Agent Server (UAS), i.e. the person called, including parameters such as, e.g. IP addresses and UDP ports for the media flow by means of the so-called Real-Time Transport Protocol (RTP).

For terminals located in a private IP area behind normally used devices such as a firewall with address transformation device, the private IP addresses are normally cited in the SDP descriptor and these terminals cannot therefore be addressed from outside the private IP area and are therefore not accessible. As the customarily used address transformation devices operate at the transition between the private and the public IP area only in layer 3 and/or layer 4 of the OSI model (OSI=Open System Interconnection), in this case only those IP addresses and ports cited in the headers of the UDP or IP protocol are transformed. The IP addresses and ports cited in the SIP or SDP protocols are contained in the so-called UDP payload and are not transformed by the address transformation devices, which results in the fact that between UAS and UAC private IP addresses and ports for the signalling and the RTP media flow are exchanged, with which no addressing and no accessibility of terminals in a private IP area is possible from outside this private IP area. Additionally, some UACs use two different ports for sending and receiving SIP messages, leading to the additional problem that even if a so-called pinhole in the firewall, in other words an opening for sending and receiving, is generated by an SIP message, such as, e.g. INVITE, the receipt of messages, such as, e.g. 200OK, is not possible at the port cited in the VIA entry of the SIP message, as in this receiving port, which in this case is not identical to the sending port anyway, no pinhole has been opened and therefore entry through the firewall is resisted. It can also occur with bi-directional RTP media flow that different UDP ports are used for sending and receiving RTP packets, so here too the problem mentioned arises.

Solutions to the above problem currently being discussed are, e.g. so-called helper protocols, such as Simple Traversal of UDP Through NAT (STUN) (NAT=Network Address Translator) or Traversal Using Relay NAT (TURN), with the aid of which a connection is produced between private and public IP addresses and ports and additionally pinholes are opened in the firewall, enabling a bi-directional RTP media flow. These solutions, though, require the installation of additional hardware, such as, e.g. servers, in the public IP area and additionally the terminals, such as, e.g. SIP telephones, must be equipped with special capabilities for evaluating and using the address transformations. Moreover, the solution based on the TURN protocol is hardly scalable, as the entire signalling and media traffic has to be conducted via a single server. Furthermore, the different kinds of address transformation, such as full cone NAT, restricted cone NAT, port restricted cone NAT, symmetric Nat, etc., are only partially supported by these approaches.

Another approach to solving the problems is to use firewalls with address transformation devices controlled by control protocols, such as, e.g. MIDCOM, MEGACO/H.248 or UpnP, based on SIP information from the application layer. However, this would require on the one hand upgrading or replacement of a multiplicity of firewalls with address transformation devices and on the other hand the installation of central or decentralised control units.

Finally, complete replacement of the firewalls with address transformation devices in the private areas with devices with the capability of SIP recognition, which are thereby capable of enabling the use of different UDP ports for sending and receiving, could also be undertaken by industry-wide agreement.

All the above-described approaches can solve the problems mentioned only partially or are very cost-intensive and complex.

The object of the invention is to create a remedy for the above-described situation.

SUMMARY OF THE INVENTION

This object is achieved according to the invention by a method for routing a bi-directional end-to-end connection between an end subscriber and the domain of a service provider by means of a signalling protocol via an interposed firewall with address transformation device, wherein by means of a security and tunnel device, located in the end-to-end connection between the end subscriber and the firewall with address transformation device in the domain of the end subscriber, and a session border controller, located in the end-to-end connection in the domain of the service provider, a tunnel is set up between the security and tunnel device and the session border controller and a bi-directional data exchange takes place via the tunnel between the end subscriber and the domain of the service provider in the area between the security and tunnel device and the session border controller by means of a tunnel protocol, a telecommunication network for executing a method for routing a bi-directional end-to-end connection between an end subscriber and the domain of a service provider by means of the SIP protocol via an interposed firewall with address transformation device, wherein there is a security and tunnel device in the end-to-end connection between the end subscriber and the firewall with address transformation device in the domain of the end subscriber, in that there is a session border controller in the end-to-end connection in the domain of the service provider, in that the security and tunnel device has means for setting up a tunnel between the security and tunnel device and the session border controller and in that the security and tunnel device and the session border controller have means for enabling a bi-directional data exchange via the tunnel between the end subscriber and the domain of the service provider in the area between the security and tunnel device and the session border controller by means of a tunnel protocol and a security and tunnel device for a telecommunication network for executing a method for routing a bi-directional end-to-end connection between an end subscriber and the domain of a service provider by means of the SIP protocol via an interposed firewall with address transformation device, wherein the security and tunnel device has means for setting up a tunnel between the security and tunnel device and a session border controller, located in the end-to-end connection in the domain of the service provider, and for enabling a bi-directional data exchange via the tunnel between the end subscriber and the domain of the service provider in the area between the security and tunnel device and the session border controller by means of a tunnel protocol.

The fundamental idea of the invention is that in bi-directional end-to-end connections with an interposed firewall with address transformation device for transmitting voice or multimedia data both the data packets serving the signalling, e.g. by SIP protocols, and the data packets containing media contents, e.g. in RTP format, are sent between the domain of an end subscriber and the domain of a service provider via a tunnel. The end points of this tunnel on the side of the service provider form a session border controller (SBC), comprising the functionalities of an SIP proxy server (e.g. back-to-back user agent) and a media switching unit, and on the side of the end subscriber a security and tunnel device which causes the construction of the tunnel and is preferably provided and checked by the service provider. The data packets addressed to the SBC by the UAC, e.g. an SIP phone, are then detected in the security and tunnel device and after being packed into a tunnel protocol are sent via the tunnel to the SBC responsible in each case, another transformation of the IP address and the port of the security and tunnel device being carried out in the firewall with address transformation device. The data packets can optionally also be encrypted in the security and tunnel device before being packed into a tunnel protocol. The link between the private IP address and the private port of the UAC to which data are to be sent as the reply to an inquiry and the IP address and the port of the security and tunnel device is stored in the session border controller (SBC). In this way private information about the UAC in the signalling and media data, such as, e.g. the private IP address of the UAC, can be terminated. Data packets which are to be sent to the UAC in the domain of the end subscriber from the domain of the service provider as the reply to an inquiry are sent to the appropriate SBC, there optionally encrypted, then packed into a tunnel protocol and then sent to the IP address and the port of the appropriate security and tunnel device in the domain of the end subscriber. The uniqueness of the address of the UAC is thus guaranteed by the combination of IP address and port of the tunnel with the private IP address and the private port of the UAC to which data are to be sent as the reply to an inquiry, i.e. the data packets embedded in tunnel packets contain as receiver address the private IP address and the private port of the UAC.

Further configurations of the invention are to be found in the subordinate claims and the following description.

BRIEF DESCRIPTION OF THE DRAWINGS

The invention is explained further below with the aid of the attached drawing.

FIG. 1 shows by way of example a network environment in which the invention can be implemented.

DETAILED DESCRIPTION OF PREFERRED EMBODIMENTS

The telecommunication network according to the invention illustrated in FIG. 1 includes the domain of an end subscriber DE and the domain of a service provider DD. The domain of the end subscriber DE comprises terminals, such as the telephone TP and computer PC illustrated here as examples, a router or switch RS, a security and tunnel device STG according to the invention and a firewall with address transformation device FW/NAP, the firewall with address transformation device FW/NAP having not only means for transforming IP addresses, but also means for transforming ports. The domain of the service provider in turn comprises a router R and a session border controller SBC, which in turn includes a media unit ME and a signalling unit SE. In the domain of the end subscriber DE the telephone TP and the computer PC are connected in each case to the router or switch RS, which in turn is connected to the security and tunnel device STG. From the security and tunnel device STG there is a further connection to the firewall with address transformation device FW/NAPT. The domain of the end subscriber DE is connected to the domain of the service provider DD on the one hand via a standard connection SV between the firewall with address transformation device FW/NAPT and the router R and on the other hand via a tunnel connection TV between the firewall with address transformation device FW/NAPT and the signalling unit SE and the media unit ME. The router R and the session border controller SBC can have further connections to network elements, such as, e.g. servers, gateways or end subscriber devices inside and outside the domain of the service provider DD, which are not drawn in in FIG. 1.

The security and tunnel device STG according to the invention has both means for receiving and sending data and means for storing data, such as, e.g. random access memories (RAMs). The security and tunnel device STG additionally also has means for checking the receiver addresses of data packets and means for establishing a tunnel connection by packing data packets, such as, e.g. IP or MAC data packets (MAC=Media Access Control), into tunnel packets, such as, e.g. IP tunnel packets.

In a further embodiment the security and tunnel device STG has means for keeping open the connection between the security and tunnel device STG through the firewall with address transformation device FW/NAPT to the session border controller SBC by a keep-alive mechanism.

In a further embodiment the security and tunnel device STG has means for encrypting data before they are packed into tunnel packets by means of a tunnel protocol and sent via the tunnel TV to the session border controller SBC and/or for encrypting the payload of these tunnel packets.

In a further embodiment the security and tunnel device STG has means for checking information on the session border controller SBC contained in the data sent by the session border controller SBC and received by the security and tunnel device STG.

In the method according to the invention, in the framework of a bi-directional end-to-end connection, e.g. based on UDP, both data packets serving the signalling, e.g. by SIP protocol, and data packets containing media contents, e.g. in RTP format, are sent. Data packets sent from one of the terminals PC or TP acting as UAC, such as, e.g. an SIP phone, are addressed to the standard session border controller SBC. The data packets arrive at the security and tunnel device STG from the terminals TP and PC via the router or switch RS. For this it must be ensured that the security and tunnel device STG is installed at a network position inside the domain of the end subscriber via which all the relevant data traffic relating, e.g. to speech or multimedia, is sent. A network position of this kind is, e.g., the LAN port (LAN—local area network) of a SOHO router (SOHO=small office/home office) or between an ADSL modem (ADSL—asymmetric digital subscriber line) and the SOHO router, wherein with the last position the security and tunnel device STG must understand the so-called point-to-point protocol (PPP) and it must additionally be ensured that the SOHO router allows the appropriate data packets to pass. For the sake of ease of viewing, in FIG. 1 neither a SOHO router nor an ADSL modem is drawn in. In the security and tunnel device STG the data packets which are addressed to the session border controller SBC are detected and then the appropriate data packets, such as, e.g. IP or MAC data packets, are packed into tunnel packets, such as, e.g. IP tunnel packets, by means of a tunnel protocol and a tunnel TV is set up between the security and tunnel device STG and the session border controller SBC.

In an advantageous embodiment the data packets are encrypted in the security and tunnel device STG before being packed into a tunnel packet and/or the payload of the tunnel packets is encrypted, e.g. by the protocol IPsec. As both the session border controller SBC and the security and tunnel device STG are under the control of the same service provider, the encrypting can be done by a low-cost solution with a lower security level, which can be implemented in the example by encrypting by the protocol IPsec with a reduced key. The individual and/or common keys can be pre-configured either in the security and tunnel device STG and/or in the session border controller SBC or distributed by the service provider by so-called smart cards.

In a further advantageous embodiment at least end point information about the tunnel relating to the session border controller SBC, such as, e.g. the IP sender address of data packets received, is checked in the security and tunnel device STG, in order to protect the domain of the end subscriber from attacks from the public network, which, though, presupposes an access network infrastructure which identifies and prevents the generation of IP addresses.

Data packets which are not addressed to the session border controller SBC pass through the security and tunnel device STG transparently and by a standard connection SV via the firewall with address transformation device FW/NAPT and a public communication network reach the router R in the domain of the service provider DD. The tunnel packets are sent from the security and tunnel device STG to the firewall with address transformation device FW/NAPT and there a transformation of the IP address and the port of the security and tunnel device STG is carried out, before the tunnel packets arrive via the tunnel TV through a public communication network in the domain of the service provider DD and are there received in the session border controller SBC. In the session border controller SBC the signalling data arrive in a signalling unit SE, e.g. in an SIP proxy server, and the media data in a media unit ME, e.g. in a media proxy server. If the incoming data are encrypted, they are additionally decrypted in the session border controller SBC. The link between the private IP address and the private port of the UAC to which data are to be sent as the reply to an inquiry and the IP address and the port of the security and tunnel device STG is stored in the session border controller SBC, and private information about the UAC in the signalling and media data, such as, e.g. the private IP address of the UAC, can thereby be terminated.

From the signalling unit SE or the media unit ME the data are forwarded to the appropriate destination addresses inside or outside the domain of the service provider DD. From the destination addresses data packets are sent to the appropriate session border controller SBC as the reply to the message from the UAC. At the same time signalling data arrive in the signalling unit SE and media data in the media unit ME. In the session border controller SBC the appropriate data packets are packed into tunnel packets by means of a tunnel protocol and sent via the tunnel TV to the security and tunnel device STG and arrive first at the firewall with address transformation device FW/NAPT.

In an advantageous embodiment the data packets are encrypted in the session border controller SBC before being packed into a tunnel packet and/or the payload of the tunnel packets is encrypted, e.g. by the protocol IPsec. As the link between the private IP address and the private port of the UAC to which data are to be sent as the reply to an inquiry and the IP address and the port of the security and tunnel device STG is known in the session border controller SBC, the uniqueness of the receiver address of the UAC is thus guaranteed, i.e. the data packets embedded in the tunnel packets contain as receiver address the private IP address and the private port of the UAC.

Normally, a mechanism is implemented in the session border controller SBC in which by repeated sending of messages to the IP address and the port of the security and tunnel device STG the connection through the firewall remains open. Should a mechanism of this kind not be implemented in the session border controller SBC, a so-called keep-alive mechanism can optionally be implemented in the security and tunnel device, in order to keep the connection through the firewall open. In the firewall with address transformation device FW/NAPT a retransformation of the IP address and the port of the security and tunnel device STG is now carried out and the data are forwarded to the latter. In the security and tunnel device STG the tunnel packets are unpacked again and if necessary decrypted and the data packets contained in the tunnel packets are sent to the private IP address and the private port of the UAC contained in the data packets.

The invention claimed is:

1. A method for routing a bi-directional end-to-end connection between an end subscriber terminal and the domain of a service provider by means of a signaling protocol via an interposed firewall with address transformation device, wherein a security and tunnel device is located in the end-to-end connection between the end subscriber terminal and the firewall with address transformation device in the domain of the end subscriber, and a session border controller is located in the end-to-end connection in the domain of the service provider, the method comprising:

setting up a tunnel between the security and tunnel device and the session border controller, performing a bi-directional data exchange via the tunnel between the end subscriber terminal and the domain of the service provider in the area between the security and tunnel device and the session border controller by means of a tunnel protocol, and storing a correlation between a private address of the end subscriber terminal and an address of the security and tunnel device in the session border controller the method further comprising at least one of, encrypting data packets by means of the session border controller before the encrypted data packets are packed into tunnel packets by means of the tunnel protocol and sent via the tunnel to the security and tunnel device, and encrypting the payload of tunnel packets by means of the session border controller.

2. The method according to claim 1, further comprising at least one of:

encrypting data packets by means of the security and tunnel device before the encrypted data packets are packed into tunnel packets by means of the tunnel protocol and sent via the tunnel to the session border controller, and encrypting the payload of tunnel packets by means of the security and tunnel device.

3. The method according to claim 1, further comprising:

checking information on the session border controller contained in the data sent by the session border controller and received by the security and tunnel device by means of the security and tunnel device.

4. The method according to claim 1, further comprising:

keeping open, by the security and tunnel device, the connection through the firewall with address transformation device between the security and tunnel device and the session border controller by means of a keep-alive mechanism.

5. A telecommunication network for executing a method for routing a bi-directional end-to-end connection between an end subscriber terminal and the domain of a service provider by means of a signaling protocol via an interposed firewall with address transformation device, comprising:

a security and tunnel device in the end-to-end connection between the end subscriber terminal and the firewall with address transformation device in the domain of the end subscriber; and a session border controller in the end-to-end connection in the domain of the service provider;

wherein the security and tunnel device is configured to set up a tunnel between the security and tunnel device and the session border controller, and wherein the security and tunnel device and the session border controller are configured to enable a bi-directional data exchange via the tunnel between the end subscriber and the domain of the service provider in the area between the security and tunnel device and the session border controller by means of a tunnel protocol, and wherein a correlation between a private address of the end subscriber terminal and an address of the security and tunnel device is stored in the session border controller, wherein the session border controller is configured to at least one of, encrypt data packets before the encrypted data packets are packed into tunnel packets by means of the tunnel protocol and sent via the tunnel to the security and tunnel device, and encrypt the payload of the tunnel packets.

6. The telecommunication network according to claim 5, wherein the security and tunnel device is configured to at least one of encrypt data packets before the encrypted data packets are packed into tunnel packets by means of the tunnel protocol and sent via the tunnel to the session border controller, and encrypt the payload of the tunnel packets.

7. The telecommunication network according to claim 5, wherein the security and tunnel device is configured to check information on the session border controller contained in the data sent by the session border controller and received by the security and tunnel device.

8. The telecommunication network according to claim 5, wherein the security and tunnel device is configured to keep open the connection through the firewall with address transformation device between the security and tunnel device and the session border controller by a keep-alive mechanism.

9. A security and tunnel device for a telecommunication network for operating a bi-directional end-to-end connection between an end subscriber terminal and a domain of a service provider by means of a signaling protocol via an interposed firewall with address transformation device, comprising:

means for setting up a tunnel between the security and tunnel device and a session border controller that is located in the end-to-end connection in the domain of the service provider, and for enabling a bi-directional data exchange via the tunnel between the end subscriber terminal and the domain of the service provider in the area between the security and tunnel device and the session border controller through a tunnel protocol, and means for detecting data packets that are addressed to the session border controller and sending the detected data packets via the tunnel, means for receiving, from the tunnel, one of, tunnel packets of data packets encrypted by the session border controller, and tunnel packets of payload encrypted by the session border controller.

10. The security and tunnel device according to claim 9, wherein the security and tunnel device further comprises means for keeping open the connection through the firewall between the security and tunnel device and the session border controller by a keep-alive mechanism.

11. The security and tunnel device according to claim 9, wherein the security and tunnel device further comprises means for at least one of encrypting data packets before the data packets are packed into tunnel packets by means of the tunnel protocol and sent via the tunnel to the session border controller, and encrypting the payload of the tunnel packets.

12. The security and tunnel device according to claim 9, wherein the security and tunnel device further comprises means for checking information on the session border controller contained in the data sent by the session border controller and received by the security and tunnel device.

13. A session border controller for use in a telecommunications network and for operating a bidirectional end-to-end connection between an end subscriber terminal and the domain of a service provider by means of a signaling protocol through an interposed firewall with address transformation device, comprising:
- a memory configured to store a correlation between a private address of the end subscriber terminal and an address of a security and tunnel device, which is located in the end-to-end connection between the end subscriber terminal and the firewall with address transformation device in a domain of the end subscriber,
- means for one of,
  - encrypting data packets before packing the encrypted data packets into tunnel packets by means of the signaling protocol and sending the tunnel packets via a tunnel to the domain of the service provider,
  - encrypting the payload of tunnel packets by means of the session border controller.

* * * * *